(No Model.)
J. H. QUINN.
VALVE.
No. 251,283.
Patented Dec. 20, 1881.
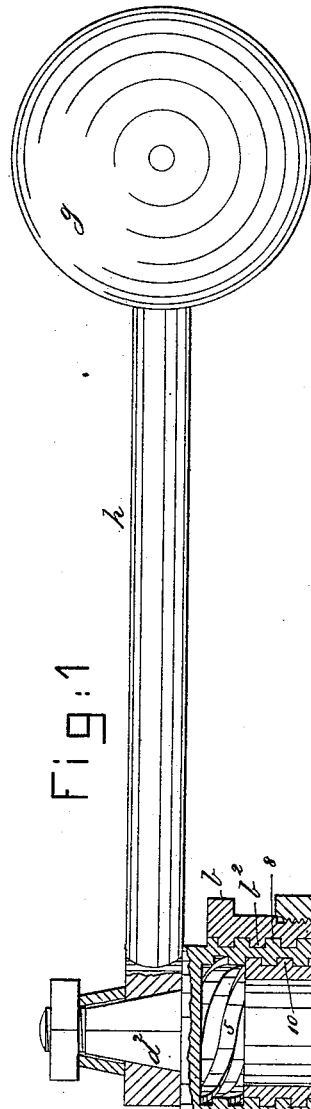
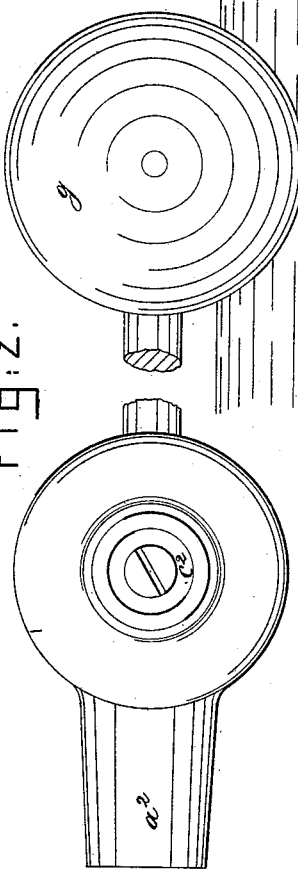
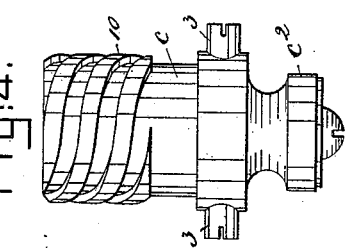
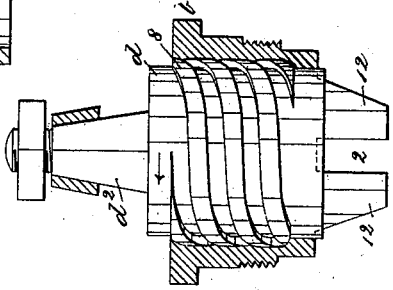
Witnesses
L. F. Connor
B. J. Noyes
Inventor.
John H. Quinn.
by Crosby & Gregory
Attys

UNITED STATES PATENT OFFICE.

JOHN H. QUINN, OF BOSTON, MASSACHUSETTS, ASSIGNOR TO JOSEPH ZANE AND FRANCIS ROACH, OF SAME PLACE.

VALVE.

SPECIFICATION forming part of Letters Patent No. 251,283, dated December 20, 1881.

Application filed October 7, 1881. (No model.)

*To all whom it may concern:*

Be it known that I, JOHN H. QUINN, of Boston, Suffolk county, State of Massachusetts, have invented an Improvement in Valves, of which the following description, in connection with the accompanying drawings, is a specification.

My invention consists, essentially, in a plug-valve having a right and left hand screw by which to impart to the plug longitudinal movements, the reverse screws accelerating the movement of the plug.

My invention is herein shown as embodied in a valve for use in the tank of a water-closet, the plug being operated through the movement of a float; but it will be understood that the invention is adapted for use in other places where plug-valves are necessary.

Figure 1 represents one of my improved valves, the float connected therewith being supposed to be so far lifted as to fully close the valve; Fig. 2, an end view of Fig. 1, the lever or handle holding the float being broken out to save space on the drawing; Fig. 3, a detail showing the outer or right-hand threaded part of the plug, and Fig. 4 a detail showing the inner or left-hand threaded portion.

The valve-casing A, provided with an inlet, $a$, and outlet $a^2$, has screwed into it a bushing, $b$, provided internally with a coarse right-hand thread, $b^2$. The bushing is provided with vertical projections 12, between which are grooves or ways 2, to receive the directing-pins 3 of the two-part plug, to be described.

The plug is composed of an inner shell, $c$, having the end piece, $c^2$, and of the outer shell, $d$, having the squared or other usual shaped head, $d^2$, by which to turn it.

The outer shell, $d$, is provided externally with right-hand screw-threads 8, to fit the threads $b^2$, and internally with left-hand threads 5, which engage left-hand threads 10 at the outer face of the inner shell, $c$. Turning the outer shell, $d$, in the direction of the arrow marked thereon, Fig. 3, causes it to move into the bushing, and at the same time the left-hand thread 5 within the shell $d$, acting on the left-hand thread 10 of the inner shell, throws it forward rapidly in advance of and in the direction of longitudinal movement of the outer shell.

The float $g$ and lever $h$ are of usual construction, the said lever being fastened to the actuating-head $d^2$ of the valve, which should be substantially horizontal. As shown in Fig. 1, the float is supposed to be resting on the surface of the water, which is at its maximum height, and the valve is closed. When the water is drawn from the tank the float $g$ in sinking will rotate the head $d^2$ and shell $d$ of the valve in the direction opposite to the arrow, Fig. 3, and thus open the valve, when the water flowing therethrough will fill the tank, raise the float, and thus close the valve again. Instead of the float and lever, I might use a handle, yet the valve described and its lever and float are of especial value in connection with the tank of a water-closet, because of the quick action in controlling the water and keeping it at the proper height.

I claim—

1. In a valve, the casing and bushing combined with a plug composed of two shells or parts provided with reverse screws, to operate substantially as described.

2. The casing provided with the inlet and outlet, the bushing, and the two-part plug composed of the part $d$, having a right and left hand thread, and the part $c$, having a left-hand thread, combined with the float and lever to automatically operate the valve-plug, substantially as described.

In testimony whereof I have signed my name to this specification in the presence of two subscribing witnesses.

JOHN H. QUINN.

Witnesses:
 JOS. P. LIVERMORE,
 B. J. HOYES.